UNITED STATES PATENT OFFICE.

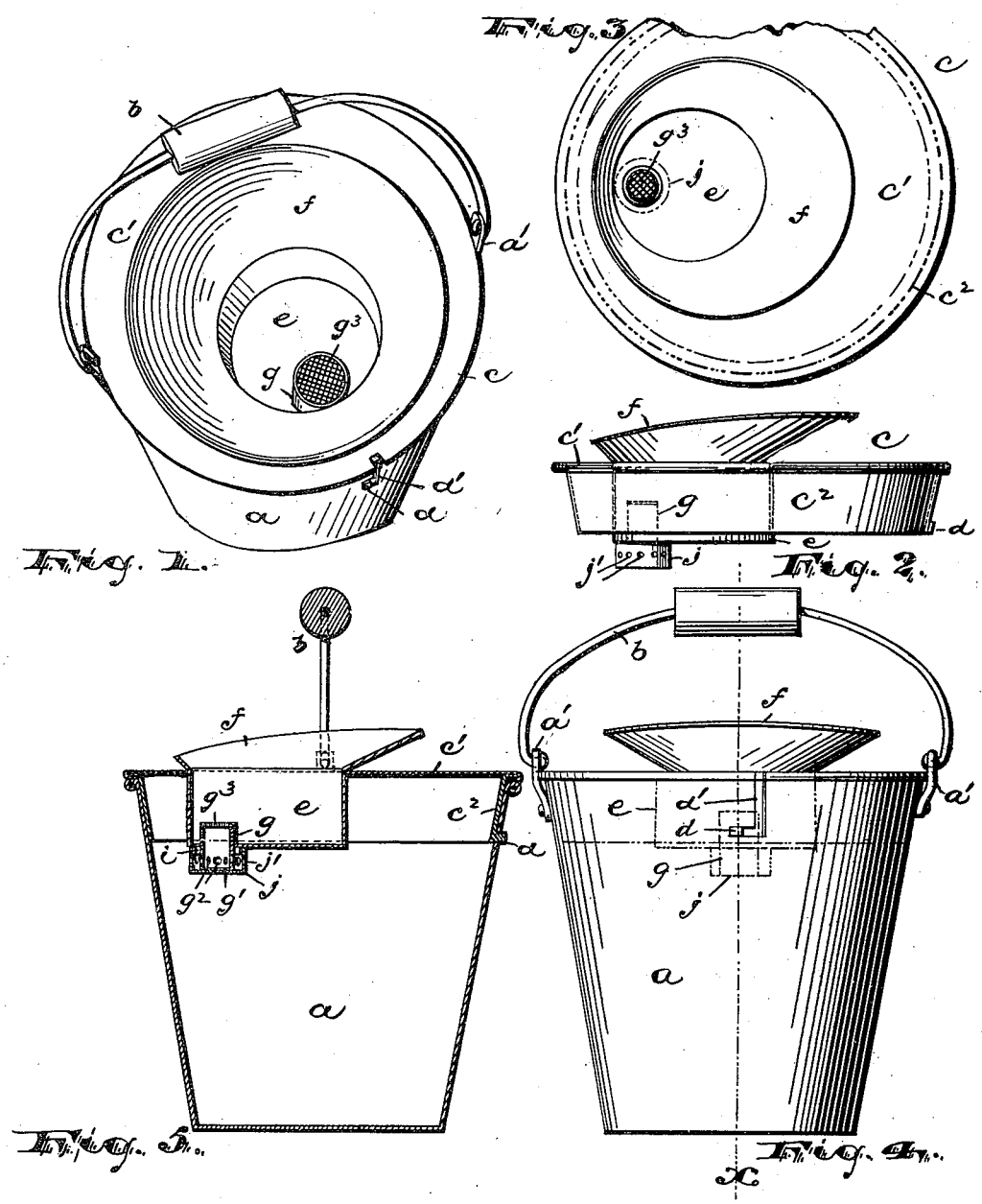

ADOLPH G. BRUGGER, OF NEWARK, NEW JERSEY, ASSIGNOR OF ONE-HALF TO FRANK A. BRUGGER, OF SAME PLACE.

MILK-PAIL.

SPECIFICATION forming part of Letters Patent No. 663,382, dated December 4, 1900.

Application filed April 9, 1900. Serial No. 12,061. (No model.)

*To all whom it may concern:*

Be it known that I, ADOLPH G. BRUGGER, a citizen of the United States, residing at Newark, in the county of Essex and State of New Jersey, have invented certain new and useful Improvements in Milk-Pails; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide an improved pail for use in milking cows; to provide a pail in which the milk is strained before entering the body portion of the pail, and thus to secure increased cleanliness by not allowing dirt to stand in the milk throughout the milking operations; to provide a milk-pail which will not permit the ready escape of its contents if accidentally kicked or tipped over and to thus prevent loss of milk, and to secure other advantages and results, some of which may be referred to hereinafter in connection with the description of the working parts.

The invention consists in the improved milking-pail and in the arrangements and combinations of parts of the same, all substantially as will be hereinafter set forth, and finally embraced in the clauses of the claim.

Referring to the accompanying drawings, in which like letters of reference indicate corresponding parts in each of the several views, Figure 1 is a perspective view of my improved pail from above. Fig. 2 is a side elevation of the cover, and Fig. 3 is a plan of the same. Fig. 4 is a side elevation of the complete pail; and Fig. 5 is a vertical central section of the same on line $x$, Fig. 4.

In said drawings, $a$ indicates the body portion of the pail, which is of any usual construction, with flaring walls provided near the top with ears $a'$ and having a bail or handle $b$, engaging said ears. Into the top of said body portion of the pail is seated the cover $c$, in which the main features of my invention more particularly inhere. Said cover comprises a flat top $c'$, adapted to rest near its edges upon the walls of the body portion of the pail and having a depending flange $c^2$, which fits inside of said walls, as is common in covered pails. Preferably said flange is provided at opposite points on the pail with outwardly-projecting lugs $d$ near the lower edge of the flange, and these lugs are adapted to enter bayonet-joint slots $d'$ in the upper edges of the walls of the body portion of the pail as the cover is put on, and thus lock the cover firmly upon the body portion. This cover $c$ closes the top of the pail against the entrance of any dirt or foreign matter and also prevents the escape of milk if the pail be accidentally kicked or tipped over. If desired, a rubber gasket or washer may be placed between the cover and upper edges of the pail in any ordinary manner to secure a more impervious joint. In the top $c'$ of said cover $c$ a circular opening is cut near one side or eccentric with the cover, and in said opening is inserted a short cylindrical receiver $e$, which depends into the body portion of the pail. This receiver $e$ is open at the top and adapted to receive the milk as it comes from the cow, and to facilitate the entrance of the streams of milk the top of the receiver is provided with a funnel-like extension $f$. This extension $f$ flares outwardly from the upper edges of the receiver $e$, and its walls are preferably higher on the side next the milker or farthest from the edge of the pail, being quite low on the opposite side to allow the streams of milk to enter.

At a suitable point, preferably adjacent to the lowest part of the extension $f$, so as to provide a clear space at the opposite side for the milk to enter, the floor of the receiver $e$ is apertured and a tubular passage $g$ inserted. This tubular passage is soldered or otherwise suitably fastened to the edges of the aperture and extends both downward into the body portion of the pail and upward into the receiver, as shown in Fig. 5. The lower end of the passage $g$ is closed transversely, as at $g'$, and just above this partition are openings $g^2$, in the walls of the passage, which provide communication between the interior of the passage and the body-chamber of the pail.

The top of the passage $g$ is covered with fine wire meshing $g^3$ or the like, and as the milk accumulates in the receiver $e$ it rises to said wire strainer and flows therethrough into the passage $g$, and so downward to the body portion of the pail. The purpose of the upwardly-projecting end of the passage $g$ in the receiver $e$ is to retain a small quantity of milk in the bottom of the receiver to serve as a cushion for the incoming jets or streams from the cow, which if they struck the tin floor of the receiver would either be deflected out of the receiver or largely dissipated into froth or foam. The milk as it descends through the passage $g$ has already been strained, it will be noted, and therefore enters the body portion of the pail in a pure condition, where it is protected from dirt by the cover $c$. It will be seen that by thus straining the milk immediately after leaving the cow and as it enters the pail a much purer product is obtained than by permitting the dirt to stand in the milk during the milking operations and be strained out afterward, as has been common.

The construction already described will not permit a very ready escape of milk from the pail in case of an accidental upsetting, but to obtain still greater security I provide upon the bottom of the receiver $e$ a downwardly-projecting flange $i$, surrounding the tubular passage $g$ at a little distance therefrom and being soldered to the receiver in any suitable manner. A cap $j$, which incloses the lower end of the tubular passage $g$, slips onto said flange and is adapted to be held in place by friction, or if necessary the said cap may screw onto the flange. The walls of the cap $j$ are perforated, as at $j'$, to afford a passage to the milk, and a more tortuous channel is thus secured, which greatly retards outflow of the milk when the pail is upset, but which permits a sufficiently easy inflow. If, therefore, the milking-pail accidentally slips from the milker or is kicked over by the cow, the cover $c$ being locked in position cannot fall off, and only a very small amount of milk besides what is in the receiver can escape before the pail is picked up. The quantity in the receiver at any one time is very small, and outward leakage through the inflow-passage is slow both because of the tortuous course of said passage and because of the lack of air-vent, so that the result is very little loss of milk by reason of the pail upsetting.

By removing the cover $c$ from the pail and then detaching the cap $j$ on said cover all parts of my improved pail are easily cleaned after being used. Furthermore, all the attachments being upon the cover in my invention it will be evident that when said cover is removed a most serviceable pail is provided for other uses than milking.

Having thus described the invention, what I claim as new is—

1. In a milking-pail, the combination with the closed body portion, of a depressed receiver in the top of the body portion, a tube passing through the bottom of said receiver and projecting at its upper end above the floor of the receiver and at its lower end below the receiver into the body of the pail, a strainer arranged across the upper extremity of said tube and the lower end having its lateral walls perforated below the receiver, and a removable perforated cap secured to the bottom of the receiver over the said lower end of the tube, substantially as set forth.

2. A milking-pail, having a cover adapted to be fastened in place, and said cover being apertured near one edge, a receiver seated in said aperture and depending into the body of the pail and having its bottom apertured, and a tube fixed in said last-mentioned aperture and having a strainer in its upper end above the bottom of the receiver, its lower end closed and its walls perforated below the receiver but above the closed end, substantially as set forth.

3. A milking-pail comprising a body portion $a$, and a cover therefor, said cover having a depressed receiver depending therefrom and having its bottom apertured, a tube arranged in said aperture and projecting at one end above the floor of the receiver and being closed by a strainer, and a cap removably secured to the under side of the bottom of the receiver over the lower end of the tube, said cap having its end closed and its walls perforated, substantially as set forth.

4. In a milk-pail, the combination with the body portion, of a cover $c$, the receiver $e$, seated in said cover and having its bottom apertured, the tube $g$, fitted in the aperture and projecting at opposite ends into the receiver and the body of the pail and having its walls perforated between its closed lower end and the bottom of the receiver, a strainer in the tube above the perforation, and a cap for the lower end of the tube, said cap having a closed end and perforated walls and being removably secured to the bottom of the receiver with its walls distant from the tube, substantially as set forth.

In testimony that I claim the foregoing I have hereunto set my hand this 30th day of March, 1900.

ADOLPH G. BRUGGER.

Witnesses:
CHARLES H. PELL,
C. B. PITNEY.